United States Patent [19]
Ward et al.

[11] Patent Number: 4,884,748
[45] Date of Patent: Dec. 5, 1989

[54] FAIRING FLAP ARRANGEMENT

[75] Inventors: Eric J. Ward, W. Palm Beach; Kevin L. Worley, Palm Beach Gardens; Kenneth M. Pesyna, Royal Palm Beach, all of Fla.

[73] Assignee: United Technologies Corporation, Hartford, Conn.

[21] Appl. No.: 239,738

[22] Filed: Sep. 2, 1988

[51] Int. Cl.$^4$ .......................................... B63H 11/10
[52] U.S. Cl. ........................ 239/265.37; 239/265.19; 60/230; 60/232; 60/271; 244/75 A
[58] Field of Search .................. 239/265.11, 265.19, 239/265.33, 265.35, 265.37; 60/228, 229, 230, 232, 271; 244/12.5, 23 D, 75 R, 75 A

[56] References Cited
U.S. PATENT DOCUMENTS

| | | | |
|---|---|---|---|
| 1,729,210 | 9/1927 | Delage | 244/75 A |
| 2,254,473 | 9/1941 | Bell | 244/75 A |
| 2,471,857 | 5/1949 | Bleakney et al. | 244/75 R |
| 2,880,575 | 4/1959 | Scialla | 239/265.37 |
| 3,367,579 | 2/1968 | Mehr | 239/265.41 |
| 4,690,329 | 9/1987 | Madden | 239/265.19 |
| 4,753,392 | 6/1988 | Thayer et al. | 239/265.33 |
| 4,765,572 | 8/1988 | Bellego et al. | 244/75 R |
| 4,799,623 | 1/1989 | Bruchez, Jr. et al. | 244/75 R |

*Primary Examiner*—Robert J. Oberleitner
*Assistant Examiner*—Christopher G. Trainor
*Attorney, Agent, or Firm*—Troxell K. Snyder

[57] ABSTRACT

An external fairing flap (26) is provided with an hydraulic spring (42, 44) for causing the external flap (26) to follow the motion of an exhaust nozzle control flap (18). The external flap (26) is hinged (32) at the leading edge thereof, and contacts the control flap (18) via corresponding rubstrips (40, 36) at the flap trailing edges (28, 38).

5 Claims, 2 Drawing Sheets

FAIRING FLAP ARRANGEMENT

This invention was made with Government support under a contract awarded by the Department of the Air Force. The Government has certain rights in this invention.

FIELD OF THE INVENTION

The present invention relates to a movable fairing flap for a nozzle in an aircraft gas turbine engine.

BACKGROUND

Thrust vectoring exhaust nozzles for aircraft applications selectively direct the exhaust gas flow from a gas turbine engine, or the like, for achieving a variable thrust direction for aircraft control and maneuvering. Such exhaust flow redirection is typically achieved by means of movable control flaps which redirect the exhaust flow as it exits the nozzle.

It is apparent that such thrust vectoring control flaps may be oriented in a manner which is not consistent with the external air flow over the airframe and, without some form of streamlining or other structure, be disruptive of such external air flow. One solution to this flow disruption is to provide a movable fairing surface positioned between the control flap and the external air flow for providing a smooth transition between the static airframe and the movable flap trailing edge. Such fairing surfaces would ideally follow the motion of the control flap closely, without a separate control or actuation system, and without interfering with the control flap movement.

Such fairing surface arrangements can be complicated in, for example, two dimensional convergent-divergent thrust vectoring nozzles wherein the downstream, or divergent, control flap pivots about an axis which is not fixed relative to the static airframe, but is rather disposed in the movable convergent control surface.

SUMMARY OF THE INVENTION

It is therefore an object of the present invention to provide a fairing arrangement for a movable control flap in a variable configuration exhaust nozzle for a gas turbine engine.

It is further an object of the present invention to provide a fairing arrangement which reduces fluttering at the trailing edge of the control flap.

It is still further an object of the present invention to provide a fairing arrangement which closely tracks the motion of the control flap automatically without externally directed positioning controls.

According to the present invention, a fairing flap arrangement for defining an external gas flow boundary over a variable configuration exhaust nozzle includes a fairing flap hingedly supported by the static airframe structure along the leading edge of the fairing flap. The fairing flap extends axially coincident with a movable control flap and includes a rubstrip at the trailing edge which is continually urged into contact with a corresponding rubstrip at the trailing edge of the control flap.

The fairing flap according to the present invention is urged rotationally toward the control flap by a hydraulic actuator which is, in turn, driven by pressurized hydraulic fluid supplied by the engine or airframe control system. The controller exerts a constant force on the fairing flap via a linkage, thus causing the fairing flap to automatically follow movement of the control flap. The constant biasing force between the downstream rubstrip of the fairing flap and the rubstrip of the control flap acts to stabilize the trailing edge of the control flap thus reducing the likelihood of fluttering under certain flow conditions.

In one particular embodiment of the arrangement according to the present invention, the control flap is positioned by a rotatable drive arm, pivotably secured at one end to the static airframe and having a roller member at the other end thereof received in a cam race disposed in the control flap. The fairing flap, hinged about an axis coincident with the pivot axis of the drive arm, is urged against the control flap rubstrip by a tension link extending between the fairing flap and a drive crank pivotably secured to the drive arm. The drive crank is in turn connected to the hydraulic actuator for transferring the actuator force to the tension link. The linkage and actuator thus move with the drive arm, maintaining an optimum position for biasing the fairing flap over the full range of motion of the control flap.

Both these and other objects and advantages of the present invention will become apparent to those skilled in the art upon review of the following specification and the appended claims and drawing figure.

DETAILED DESCRIPTION OF THE PREFERRED EMBODIMENT

Figure 1:
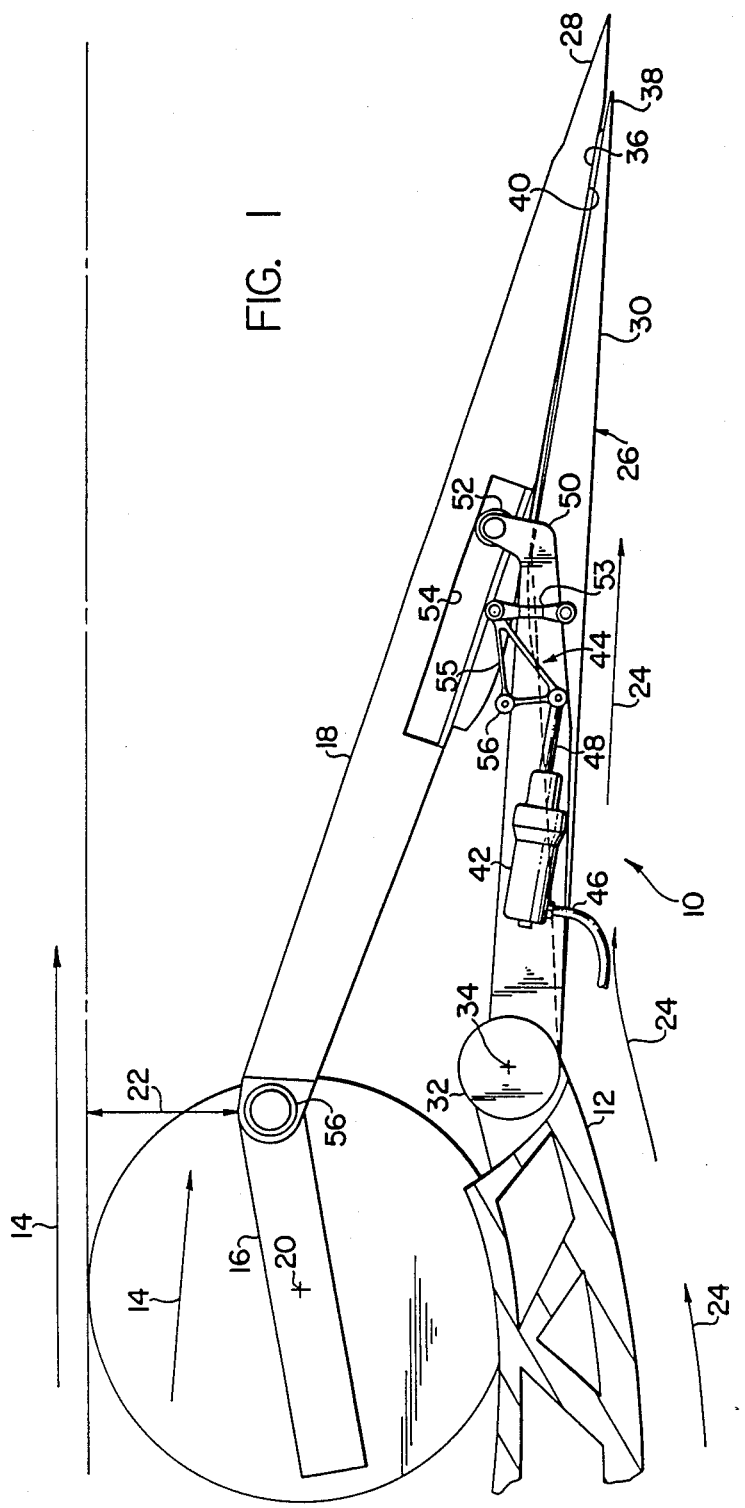
FIG. 1 shows a half plane, longitudinal cross section of a two dimensional thrust vectoring exhaust nozzle having an external fairing arrangement according to the present invention.

Referring to the drawing figure, and in particular to FIG. 1 which shows a half plane longitudinal cross section of a thrust vectoring exhaust nozzle 10, the preferred embodiment of the fairing arrangement according to the present invention will be disclosed and explained in detail. The exhaust nozzle 10 is disposed downstream of a gas turbine engine (not shown) which supplies a stream of pressurized exhaust gas 14 for propelling the aircraft static structure 12. The nozzle consists of one or more control flaps 16, 18 which are selectively configurable for redefining the exhaust gas flow path within the nozzle 10, and hence the flow direction and resultant thrust of the gases 14 as discharged.

Figure 2:
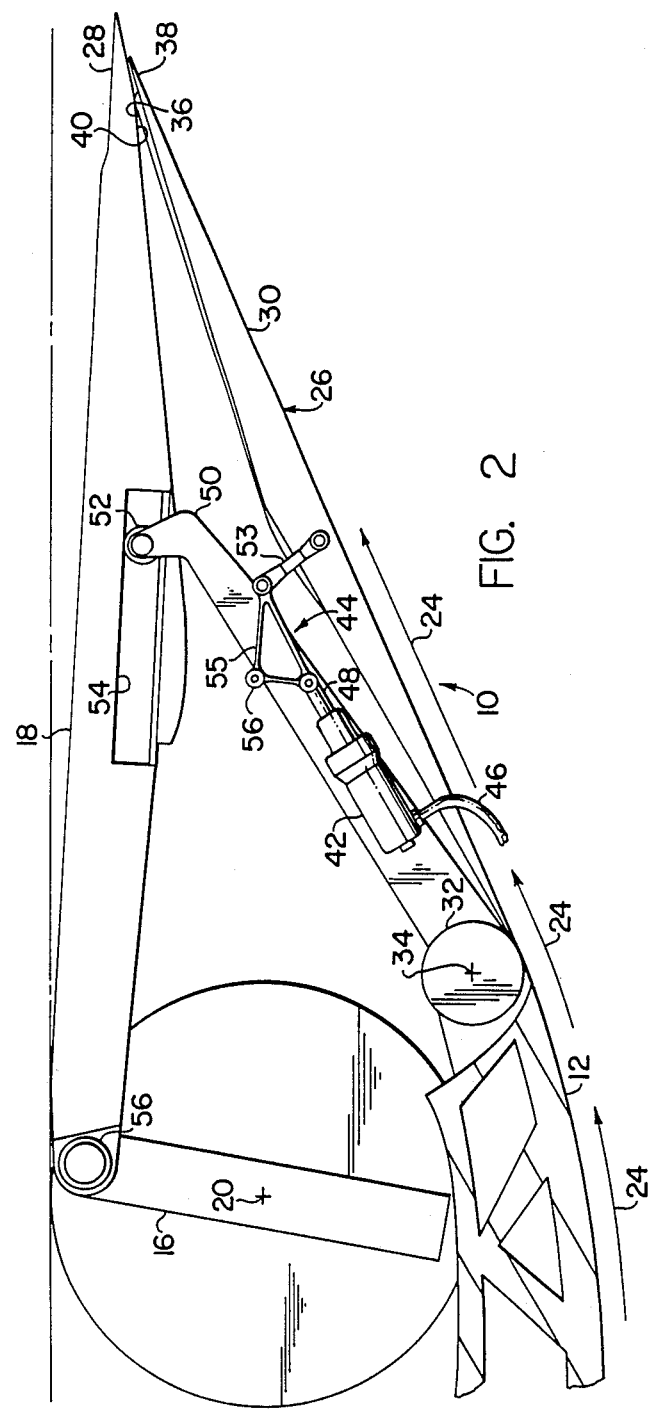
FIG. 2 shows the nozzle of FIG. 1 at an extreme of the possible range of movement of the divergent flap.

For a nozzle 10 as shown in FIGS. 1 and 2, the exhaust gas flow path is configurable so as to sequentially converge and diverge depending on the operating regime of the nozzle and aircraft. The upstream, or convergent flap 16, is thus movable about an axis 20 in order to vary the nozzle throat opening 22 as desired to achieve optimum nozzle outlet area and exhaust gas velocity. As shown in FIG. 2, convergent flap 16 may be rotated into a fully blocking arrangement wherein the exhaust gases 14 are redirected forwardly via reverser vents (not shown) for providing reverse or breaking thrust to the airframe 12.

As discussed in the preceding background section, it is desirable to provide a smooth exterior surface over both the airframe 12 and the nozzle 10 in order to avoid detachment or turbulence of the externally flowing airstream 24. In the embodiment of the nozzle 10 shown in FIG. 1, it is clear that the convergent flap 16 is disposed within the airframe static structure 12. The downstream or divergent control flap 18, however, extends aftward of the static structure 12 and would, without the fairing arrangement according to the present invention, generate significant and unacceptable turbulence in the external airflow 24.

Hence, the fairing arrangement 26 according to the present invention is disposed between the divergent control flap 18 and the external airflow 24, extending between the downstream extremity of the static structure 12, contacting the divergent flap 18 adjacent the trailing edge 28 thereof. The fairing arrangement 26 includes a generally planar fairing flap 30 supported at the leading edge thereof by a hinge 32 rotating about an axis 34 extending generally transversely with respect to the exhaust and exterior flows 14, 24.

The fairing flap 30 includes a rubstrip 36 disposed adjacent the trailing edge 38 thereof and urged continually into contact with a corresponding parallel rubstrip 40 extending adjacent the trailing edge 28 of the divergent flap 18. The means for urging the fairing flap 30 rotationally about the supporting hinge 32 may be any of a variety of actuators, springs, or other force inducing structures known in the art, and is shown in the preferred embodiment of FIGS. 1 and 2 as including an hydraulic actuator 42 and linkage designated generally 44. The actuator 42 receives hydraulic fluid 46 under constant pressure from the aircraft or engine control system, thus acting like a hydraulic spring by exerting a constant thrust or tension on an extendable actuator rod 48.

In the preferred embodiment, the divergent flap 18 is positioned, at least in part, by a drive arm 50 rotatable about the axis 34 coincident with the hinge axis of the fairing flap 30. Drive arm 50 includes a roller member 52 received within a linear cam race 54 disposed in the divergent flap 18, and, in conjunction with the hinge joint 56 between the convergent flap 16 and the leading edge of the divergent flap 18, selectively orients the divergent control flap 18 for directing the flow of exhaust gas 14.

The actuator 42 and linkage 44 according to the present invention are mounted on the drive arm 50, moving therewith about the axis 34 in conjunction with the fairing flap 30 and thereby remaining in an optimum position for urging the fairing flap 30 against the control flap 18. Actuator linkage 44 comprises a tension link 53 secured at one end to the fairing flap 30 at a pivot point spaced apart from the supporting hinge axis 34 and at the other end to a drive crank 55 which is pivotally secured 56 to the drive arm 50. The actuator 42, is also secured to the drive arm 50 and, via the extendable push rod 48, linked to the drive crank 55 for inducing a constant tension force through the tension link 53 via the drive crank 55.

As will be appreciated to those skilled in nozzle and kinematic arts, the movements of the control flap 18 are complex due to the fact that the forward hinge 56 is movable with respect to the airframe 12. The fairing arrangement 26 according to the present invention, however, is automatically urged against the control flap rubstrip 40 by the linkage and actuator 44, 42 thereby achieving a close fitting external surface for guiding the external air flow 24 without requiring a sophisticated positioning controller or the like.

By positioning the actuator 42 and linkage on the drive arm 50 which is rotatable about a common axis 34 with the fairing flap 30, the fairing arrangement 26 according to the present invention maintains the actuator and linkage 42, 44 in an optimum position relative to the fairing flap 30 for rotationally urging the fairing flap 30 about the supporting hinge 32 and toward the divergent control flap 18 over the entire range of movement thereof. Further, the constant biasing force imparted by the fairing flap rubstrip 36 against the rubstrip 40 adjacent the trailing edge 28 of the divergent control flap 18 acts to dampen any flutter or other instability which may occur in the cantilevered portion of the control flap 18 downstream of the cam race 54.

One final advantage of the fairing arrangement 26 according to the present invention is the reduction in weight which may be achieved in both the divergent control flap 18 and the fairing flap 30 by the use of rubstrips 40, 36 and by supporting the actuator 42 and urging linkage 44 on the drive arm 50. The fairing flap 30 is thus subjected to substantial loading at the supporting hinge 34, and the rubstrip 36, with the tension link 53 imparting a constant, selected control force over the entire range of motion. The damping effect caused by the biasing force exerted between the rubstrips 36, 40 also produces the rigidity and hence reduces weight of the downstream portion of the control flap 18 for the same resistance to fluttering.

Although disclosed and described in a half plane cross section and for a two dimensional, convergent-divergent nozzle, it is to be appreciated that the fairing arrangement according to the present invention may be embodied in a variety of equivalent mechanical interpretations not limited by the preferred embodiment described and disclosed herein, but is solely defined by the claims presented hereinbelow.

We claim:

1. An external fairing arrangement extending between a static air frame and a downstream end of a movable, gas directing control flap, comprising
   a generally planar fairing flap, including
   an upstream leading edge and a downstream trailing edge,
   a supporting hinge, secured to the static airframe and extending transversely with respect to an external airframe airflow, said hinge being coincident with the leading edge of the fairing flap,
   a first rubstrip, disposed adjacent the trailing edge of the fairing flap;
   a second rubstrip, disposed adjacent the downstream end of the control flap and oriented to contact the first rubstrip; and
   means for continually urging the fairing flap rotationally about the supporting hinge and into contact with the control flap at the first and second rubstrips,
   wherein the control flap is supported by a second hinge joint disposed along an upstream edge thereof, the control flap being positioned by a drive arm having a roller member received within a cam race disposed in the control flap.

2. The fairing arrangement as recited in claim 1, wherein
   the drive arm rotates about an axis coincident with the supporting hinge of the fairing flap, and
   wherein the urging means is disposed between the fairing flap and the drive arm.

3. The fairing arrangement as recited in claim 2, wherein the urging means includes,
   a hydraulic linear actuator in fluid communication with a pressurized source of hydraulic fluid.

4. The fairing arrangement as recited in claim 3, wherein the urging means further includes
   a drive crank rotationally mounted to the drive arm and including a first link pivot and a second actuator pivot,
   a tension link extending between the first link pivot and the fairing flap, and
   wherein the hydraulic actuator acts between the drive arm and the second actuator pivot for tensioning the tension link thereby biasing the fairing flap toward the control flap.

5. The fairing arrangement as recited in claim 1, wherein
   the hinge joint of the control flap links the control flap to an upstream control member, said control member being movable with respect to the fairing flap supporting hinge.

* * * * *